Figure 1:
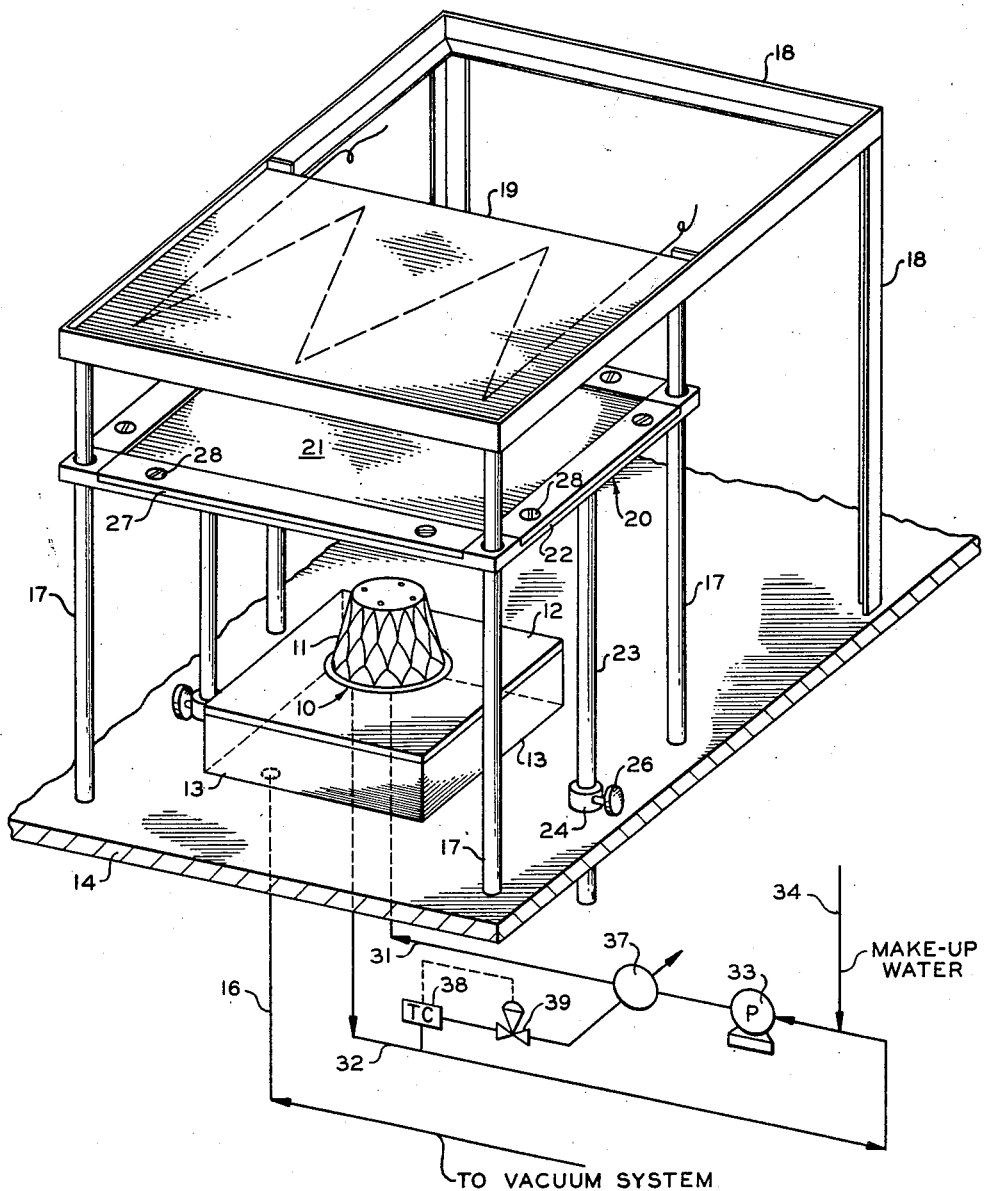

INVENTORS
ROBERT DOYLE
W. L. HOLT
W. E. COOPER

ATTORNEYS

United States Patent Office 3,121,920
Patented Feb. 25, 1964

3,121,920
APPARATUS FOR VACUUM MOLDING
POLYMER SHEETS
Robert Doyle, William L. Holt, and Wayne E. Cooper, Bartlesville, Okla., assignors to Phillips Petroleum Company, a corporation of Delaware
Original application June 16, 1958, Ser. No. 742,331, now Patent No. 3,019,488, dated Feb. 6, 1962. Divided and this application June 26, 1961, Ser. No. 119,603
1 Claim. (Cl. 18—35)

This invention relates to apparatus for vacuum molding polymer sheets.

This application is a division of our copending application Serial No. 742,331, filed June 16, 1958, now Patent No. 3,019,488.

Various methods are described in the literature for producing normally solid and semi-solid polymers. For example, hydrocarbons such as ethylene, propylene, isobutene, butadiene and styrene can be polymerized, either independently or in various admixtures with one another, to produce semi-solid or solid polymers. Recently, considerable attention has been directed to the production of solid polymers of ethylene and/or propylene. The polymerizations are frequently carried out at low pressures in the presence of solid catalysts, and high molecular weight polymers, such as polyethylenes, have been produced which have properties superior to those of low density, low crystallinity polymers prepared by previously known methods. These polymers differ from the latter polymers, which can be produced by high pressure processes, particularly as regards their high crystallinity, which may be in excess of 90 percent at 25° C., and they are especially useful where high stiffness and high tensile strength are desired. These highly crystalline polymers are suitable for a wide variety of applications, a very important one being their use in the manufacture of molded articles. However, when using conventional methods of vacuum forming in fabricating molded articles of the highly crystalline polymers, it has been found that the products are often non-uniform and are subject to considerable warpage after cooling to room temperature.

An object of the invention is to provide an improved apparatus for vacuum molding plastic sheets.

Other and further objects and advantages of the invention will become apparent to those skilled in the art upon consideration of the accompanying disclosure.

The instant invention is concerned with an apparatus for vacuum forming articles from polymer sheets so as to provide products which are uniform and warpage-free. Broadly speaking, in a process in which a sheet of a high density, highly crystalline polymer is formed into a molded article by heating the sheet and thereafter pulling the sheet around the mold by evacuating the air from between the mold and the sheet, the invention resides in the improvement which comprises controlling the temperature of the mold so that its surface is at a predetermined temperature when the sheet initially contacts the mold surface. In general, the temperature of initial contacting is in the range of 150 to 230° F., the particular temperature used being dependent upon certain variables, including the configuration of the mold, the particular polymer employed, and the thickness of the polymer sheet.

In one embodiment, the apparatus of this invention for vacuum molding thermoplastic sheets comprises a mold, means for heating a plastic sheet, means for drawing a heated plastic sheet around the mold, means for evacuating air from between the mold and the heated plastic sheet, and means for controlling the temperature of the surface of the mold.

In another embodiment, the apparatus of this invention for vacuum forming a sheet of plastic material into an article of a desired shape comprises a hollow mold in the form of a shell open at one end and closed at the opposite end and having walls with an exterior surface in the shape of the article to be molded, passageways formed in the walls of the shell and extending through the exterior surface of the shell, means associated with the passageways for evacuating air from between the exterior surface of the shell and the plastic sheet, a removable, cooperating insert member adapted to be positioned within the shell and having an outer surface substantially of the same shape as and spaced apart from the inner surface of the shell, means for circulating a heat exchange medium between the interior surface of the shell and the outer surface of the insert member, means for controlling the temperature of said circulating heat exchange medium, means or holding a sheet of plastic material above the mold, the holding means being adapted to move the sheet into contact with the mold, and means for heating the sheet of plastic material prior to its being placed into contact with the mold.

Figure 2:
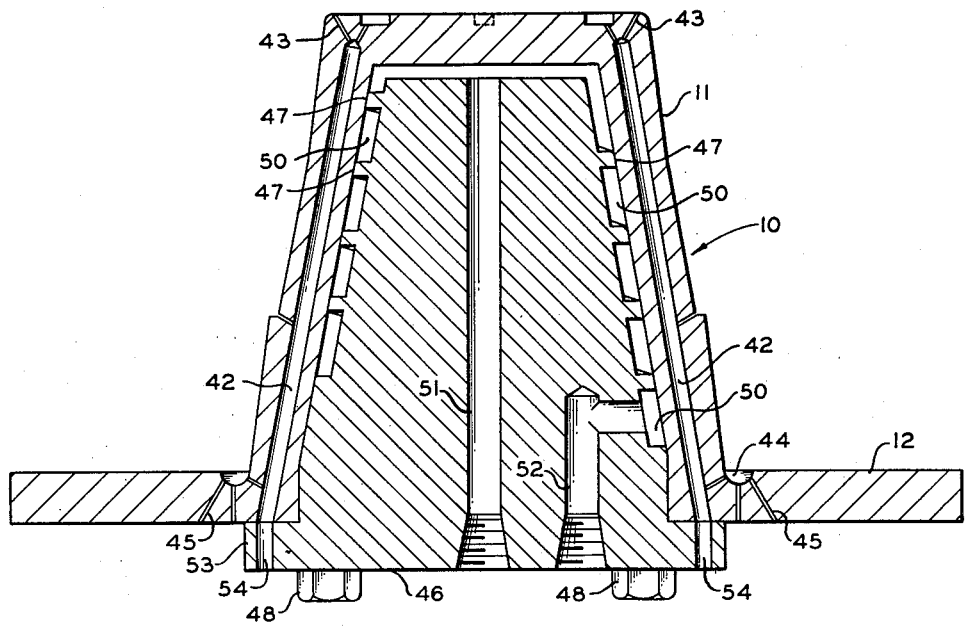
Figure 3:
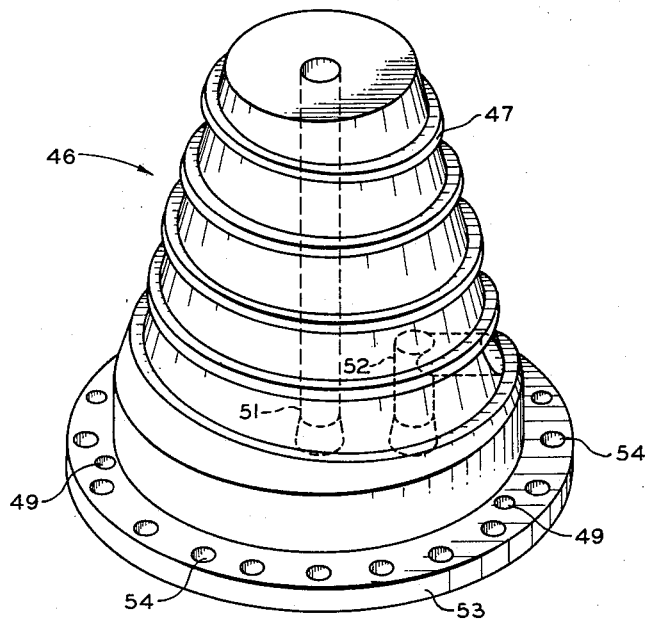

For a more complete understanding of the invention, reference is made to the drawings, in which FIGURE 1 is an isometric view showing an arrangement of apparatus according to this invention;

FIGURE 2 is a cross sectional view illustrating the mold and removable insert member of the apparatus of the invention; and FIGURE 3 is an isometric view showing the removable insert member.

Referring now to FIGURE 1 of the drawings, an arrangement of apparatus is illustrated which is particularly adapted for practicing the process of this invention. As shown in FIGURE 1, mold 10 comprises a shell 11 in the form of a frustum and a base plate member 12 attached to the lower periphery of the shell. In the usual case the base plate member is formed as an integral part of the shell. The surface of the shell as shown can be provided with a decorative design which is imparted to the molded article. While the mold as depicted is suitable for forming an article such as a flower pot, it is to be understood that the mold can conform to other shapes so as to form an article having practically any desired configuration. Base plate 12 attached to lower periphery of shell 11 rests upon four vertical side members 13 which in turn are positioned upon platform 14. Any suitable holding means, such as screws can be employed to secure the base plate member to the vertical side members and these latter members to the platform. Platform 14 can conveniently be the top of a bench or table. Base plate member 12, vertical side members 13, and platform 14 cooperate to form a vacuum chamber which is connected by means of line 16 to a vacuum system or means for exhausting air from the chamber. Any suitable pumping means (not shown) can be used as the vacuum system to produce the desired vacuum in the vacuum chamber and in the passageways formed in shell 11 and communicating with the chamber.

Vertical support members 17 are attached to and extend upwardly from platform 14. A framework 18, which conveniently comprises four angle members connected in the form of a square, is affixed to the upper ends of support members 17. Framework 18 serves as a support for a heating means, such as electrical heating element 19, which rests in the recesses on the angle members. The heating element is connected to a suitable source of electrical current, which is not shown in the drawing. Positioned below framework 18 is a carrier 20 which is adapted to hold a plastic sheet 21 clamped in a horizontal position above mold 10. It is to be noted that heating means 19 is adapted to slide in framework 18 so that it can be positioned other than directly above the carrier. It is important to be able to move the heating means in this manner when inserting a plastic sheet in the carrier in order to provide ample working room and to avoid possible burns to the operator. The carrier comprises four narrow plate members 22 which are joined to one another at their ends so as to form a rectangular frame. The corners of the frame are each provided with an opening through which four of the vertical support members 17 extend. This arrangement of apparatus makes it possible to raise and lower the carrier as may be required in the molding operation. A vertical guide member 23, which is affixed to the underside of carrier 20, passes downwardly through platform 14. By providing the vertical guide member above the platform with a collar 24, fitted with a screw 26, it is possible to lock the carrier in any desired vertical position with relation to the mold and heating element. The intermediate section of each of the plate members 22 of the carrier is cut out in order to provide a recess for lock members 27 which serve to hold the plastic sheet in position in the carrier. Screws 28 furnish means for attaching the lock members securely to plate members 22. When positioning a plastic sheet in the carrier, a square is first cut from each of the corners of the sheet so that it may be placed in the recesses of the plate members. Thereafter, the lock members are secured by screws 28, thereby locking the plastic sheet rigidly in place in the carrier. It is to be understood that other arrangements of apparatus for holding the plastic sheet in position can be utilized without departing from the spirit or scope of the invention.

As will be discussed more in detail hereinafter, during the molding operation, a heat exchange medium is utilized to maintain the surface of the mold at a desired temperature. The heat exchange medium is supplied to the mold by means of line 31 and is withdrawn therefrom through line 32. A closed system is utilized, pump 33 providing the means for circulating the water through the system. Line 34 is attached to the system in order to furnish any make-up heat exchange medium which may be necessitated by losses occurring during the molding operation. An indirect heat exchanger 37 is provided in line 31 in order that the water being circulated through the mold can be brought to a desired temperature. Temperature controller 38 is operatively connected to outlet line 32 and to a motor valve 39 in the line supplying heat exchange medium to heat exchanger 37. This arrangement of apparatus furnishes means for controlling the amount of heat exchange medium supplied to heat exchanger 37 in accordance with the temperature of the heat exchange medium in line 32.

A better understanding of the mold and the removable insert member associated therewith can be obtained by referring to FIGURE 2. Identical reference numerals have been used to designate elements which have been previously referred to in conjunction with FIGURE 1. Mold 10 is hollow, being in the form of a shell 11 open at one end and having walls with an exterior surface in the shape of the article to be fabricated. A plurality of passageways 42 are formed in the walls of the shell and communicate with the exterior surface of the shell by means of smaller passageways 43. A groove 44 is cut around the lower periphery of the shell in base plate 12. A series of smaller passageways 45 extend from this groove through the base plate or the side of shell 11. These latter passageways communicate with both the larger passageways 42 and the vacuum chamber of which base plate 12 forms one side.

Positioned within shell 11 is an insert member 46 having an outer surface with substantially the same configuration as the inner surface of the shell. The surface of the insert member, which is spaced apart from the inner surface of the shell, has a helical screw thread 47 formed thereon. The structure of the insert member can be better understood by also referring to FIGURE 3 of the drawing in which identical reference numerals have been used to designate previously described elements. When the insert member is in position in the shell, the helical thread is held firmly in place against the inner surface of the shell by means of bolts 48 which pass through bolt holes 49 in the insert member and are threaded into the wall of the shell. It is seen that the sides of the helical thread, the outer surface of the insert member and the inner surface of the shell form a spiral channel 50 extending from the top to the bottom of the insert member. A central opening 51 formed in insert member 46 provides means for passing water or other suitable heat exchange medium through the insert member and into the upper end of the channel formed by the helical thread. Another opening 52 formed in the insert member extends from the bottom of this member to the lower end of the channel formed by the helical thread. Opening 52 furnishes means for withdrawing heat exchange medium from the apparatus after it has circulated through the spiral channel. Openings 51 and 52 are each provided with threads to which lines 31 and 32 respectively, as shown in FIGURE 1, are connected. Flange 53 of insert member 46 is provided with passageways 54 which form an extension of passageways 42 of shell 11.

Reference is made to U.S. Patent No. 3,019,488 for a description of the process carried out in the apparatus of this invention.

A better understanding of the present invention can be obtained by referring to the following illustrative examples which are not intended, however, to be unduly limitative of the invention.

EXAMPLE I

A series of runs was carried out in which articles were produced in a vacuum forming operation utilizing plastic sheets formed of a high density, highly crystalline polyethylene. The polyethylene was prepared according to a method described in the Hogan and Banks patent referred to hereinbefore using a chromium oxide-containing catalyst. Typical physical properties of polyethylene prepared by this method are as follows:

Density, g/cc. at room temperature [1]_____ 0.940–0.970
Crystallinity, percent [2]_____ 92
Softening temperature, °F.[3]_____ 260
Brittleness temperature, °F.[4]_____ −180
Melt index [5]_____ 0.2–5
Heat distortion temperature, °F.[6]_____ 170
Tensile strength (max.) p.s.i. [7]_____ 4,400
Impact strength, Izod (ft. lbs./in. notch) [8]__ 1.2–14

[1] Determined by immersion in a solvent having a density equal to that of the polymer, a Westphal balance being utilized.
[2] Method adapted from that of Mathews, Pieser and Richards, Acta Cryst. 2, 85 (1949).
[3] Determined by the use of a Goodrich plastometer as described by Karrer, Davies and Dietrich, I. and E. Chem., Analytical Edition, 2, 96–99 (1930), on the plasticity curve obtained according to the published method, the point at which the tangent to the curve a slope of 60° was determined, and the tangent was extrapolated to obtain the softening temperature.
[4] ASTM D–746–55T.
[5] ASTM D–1238–52T.
[6] ASTM D–646–45T.
[7] ASTM D–412–51T (die C-crosshead speed 20 in./min.).
[8] ASTM D–456–54T (¼" bar).

The male form mold utilized in these runs was machined from an aluminum plate in the form of a shield. The mold had a 14" x 14" base plate, and the shield itself had a diagonal measurement of 9¼ inches. The height from the bottom of the sealing groove around the shield to the highest point on the face of the shield was ½ inch. A clamping frame or carrier similar to that shown in the dawing was used to hold the plastic sheets. There was a ¼" clearance between the edges of the base plate of the mold and the inside edges of the clamping frame.

During each vacuum forming operation, heating rods were moved in proximity to the mold in order to heat the mold. Thereafter, the heating rods were moved away from the mold, and a 60 mil plastic sheet formed by extrusion of the above-described polyethylene, was placed in the clamping frame. The plastic sheet was then heated, the heater rods during this period being 5 inches above the sheet while the sheet was 9 inches above the face of the mold. The clamping frame was then pulled down ½ inch below the base plate of the mold so as to ensure a good vacuum seal. During this period, a vacuum system was in operation so as to evacuate air from between the shield and the plastic sheet. A surface pyrometer was used to check the surface temperature of the mold just prior to contacting the plastic sheet with the mold. The heating of the plastic sheet required 40 seconds while the forming operation took 25 seconds, giving a total cycle time of 65 seconds. The formed article was immediately cooled after the forming operation by means of a blast of air from an air hose. The results of the various runs are set forth hereinbelow in Table I. The temperature shown in the column labeled "Mold Temperature" is the temperature of the mold just prior to its being contacted with the plastic sheet.

*Table I*

| Run No. | Mold Temperature, °F. | Warpage, inch [1] | Direction of Warpage [2] |
|---|---|---|---|
| 1 | 78 | ⅝ | Concave. |
| 2 | 95 | ½ | Do. |
| 3 | 110 | ⅜ | Do. |
| 4 | 150 | 5/16 | Do. |
| 5 | 175 | None | Flat. |
| 6 | 190 | None | Do. |
| 7 | 205 | 1/16 | Convex. |
| 8 | 210 | 3/16 | Do. |
| 9 | 215 | ⅜ | Do. |
| 10 | 230 | ⅜ | Do. |
| 11 | 235 | ¾ | Do. |

[1] Warpage was measured after the molded articles had cooled to room temperature by placing the article on a flat surface, holding one edge of the article firmly against the flat surface, and measuring the distance the opposite edge was raised above the flat surface. No difference was noted in the amount of warpage after the articles had set at room temperature for one week.
[2] Direction with respect to mold face.

From a consideration of the data in Table I, it is seen that with the particular mold and polymer sheets used no warpage of the molded articles occurred when the molten sheets contacted the mold having a surface temperature of 175 and 190° F. It is noted that these temperatures are between 150 and 230° F. which, as discussed hereinbefore, is the temperature range in which the mold surface is maintained at initial contacting of the molten polymer sheets in accordance with this invention in order to obtain uniform, warpage-free products.

EXAMPLE II

A series of runs was carried out in which light diffuser panels were vacuum formed from 60 mil sheets of polyethylene. Apparatus similar to that shown in the drawing was utilized in these runs. The polyethylene used in extruding the 60 mil sheets was similar to the polymer described in Example I. The procedure followed was to place a plastic sheet in the carrier and then move the carrier near the heating element in order to heat the sheet. The carrier was then moved downwardly until the edge of the carrier was below the base plate of the mold. The surface of the mold was maintained at a desired surface temperature by circulating water through the mold as described in conjunction with the drawing. During the molding operation, a vacuum system was operating so as to evacuate air from between the sheet and mold surface.

After being formed, the panel was removed from the mold and allowed to reach room temperature. A section was then cut from the panel annealed in an autoclave at 250° F. and 15 p.s.i.g. for 20 minutes. The amount of shrinkage was determined after the annealed section had reached room temperature. The results of these runs are set forth hereinbelow in Table II. The column labeled "Mold Surface Temperature" in this table indicates the temperature of the mold immediately before it was contacted with the polyethylene sheets. The mold temperature was measured in each case with a surface pyrometer.

*Table II*

| Run No. | Mold Surface Temperature, °F. | Shrinkage in./in. | | Warpage Observed |
|---|---|---|---|---|
| | | TD [1] | MD [2] | |
| 12 | 195 | 0.030 | 0.028 | Smooth surface—no perceptible warpage. |
| 13 | 170 | 0.030 | 0.028 | Do. |
| 14 | 150 | 0.031 | 0.031 | Do. |
| 15 | 140 | 0.032 | 0.031 | Surface rough. |
| 16 | 100 | 0.034 | 0.033 | Do. |

[1] Transverse direction of the sheet.
[2] Machine direction of the sheet.

It is seen from an examination of the data in Table II that desirable molded articles were obtained when mold surface temperatures of 150, 170 and 195° F. were employed. All of these temperatures are in the range of 150 to 230° F., the temperature range in which the molding operation of this invention is conducted. However, when temperatures outside of the range, i.e., below 150° F., were used, non-uniform articles having a rough surface were obtained.

EXAMPLE III

A series of runs was conducted in which compartmented food trays were vacuum formed from 125 mil sheets of polyethylene. Apparatus similar to that shown in the drawing was used in these runs, and the sheets were formed of a polymer similar to the polymer described in Example I. The procedure followed in forming the trays was the same as that used in Example II. The mold utilized in these runs had a configuration such as to give a tray which was 16 inches wide and 22 inches long and had a depth of 1.5 inches at several points.

After the trays had cooled to room temperature, each tray was placed on a flat surface, and the distance from the bottom of the tray to the flat surface was measured at each corner of the tray. The maximum measurement, termed warpage, is shown hereinbelow in Table III for each of the runs. The mold temperature shown in the table is the surface temperature of the mold when the mold was initially contacted with the molten polymer sheet.

| Run. No. | Mold Temperature, °F. | Warpage, inch [1] |
|---|---|---|
| 17 | 160 | ⅜ |
| 18 | 190 | 3/16 |
| 19 | 210 | ⅛ |
| 20 | 225 | <1/16 |

[1] According to specification requirements, a tray having a warpage value of ⅛ inch or less was considered to be satisfactory.

It is seen from an examination of the data shown in Table III that with the particular mold and polymer sheets employed mold surface temperatures of 210 and 225° F. gave satisfactory products. These temperatures are in the range of 150 to 230° F., the temperature range in which the vacuum forming process of this invention is carried out.

It will be apparent to those skilled in the art that variations and modifications of the instant invention can be made in view of the foregoing disclosure. Such variations and modifications are believed to clearly come within the spirit and scope of the invention.

We claim:

Apparatus for vacuum forming a plastic sheet into an article of a desired shape which comprises a hollow mold in the form of a shell, open at one end and closed at the opposite end, and having walls with an exterior surface in the shape of the article to be formed; passageways formed in said walls of said shell and extending through said exterior surface of said shell; means associated with said passageways for evacuating air from between said exterior surface of said shell and said plastic sheet; a removable cooperating insert member adapted to be positioned within said shell and having an outer surface substantially of the same shape as and spaced apart from said shell's interior surface; means for circulating a heat exchange medium between said interior surface of said shell and said outer surface of said insert member; means for controlling the temperature of said circulating heat exchange medium; means for holding said plastic sheet above said mold, said means being adapted to move said sheet into contact with said mold; and means for heating said plastic sheet prior to its being placed into contact with said mold.

References Cited in the file of this patent

UNITED STATES PATENTS

| | | |
|---|---|---|
| 2,432,668 | Kingston | Dec. 16, 1947 |
| 2,514,718 | Oaks | July 11, 1950 |
| 2,517,701 | Oettinger | Aug. 8, 1950 |
| 2,579,898 | Brucker | Dec. 25, 1951 |
| 2,690,593 | Abercrombie | Oct. 5, 1954 |
| 2,793,006 | Eaby | May 21, 1957 |
| 2,836,852 | Butzko | June 3, 1958 |
| 2,867,414 | Maloney et al. | Jan. 6, 1959 |
| 2,875,985 | Hold | Mar. 3, 1959 |
| 2,915,292 | Gross | Dec. 1, 1959 |